United States Patent
Oh et al.

(10) Patent No.: US 9,160,017 B2
(45) Date of Patent: Oct. 13, 2015

(54) FUEL CELL STARTUP APPARATUS COMPRISING EMERGENCY AIR SUPPLIER AND METHOD

(71) Applicant: Hyundai Motor Company, Seocho-gu, Seoul (KR)

(72) Inventors: Dong Jo Oh, Gyeonggi-do (KR); Jong Hyun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 310 days.

(21) Appl. No.: 13/688,438

(22) Filed: Nov. 29, 2012

(65) Prior Publication Data
US 2014/0057189 A1 Feb. 27, 2014

(30) Foreign Application Priority Data
Aug. 21, 2012 (KR) .................. 10-2012-0091063

(51) Int. Cl.
*H01M 8/02* (2006.01)
*H01M 8/04* (2006.01)

(52) U.S. Cl.
CPC ...... *H01M 8/04223* (2013.01); *H01M 8/04089* (2013.01); *H01M 8/04567* (2013.01); *H01M 8/04753* (2013.01); *Y02E 60/50* (2013.01)

(58) Field of Classification Search
CPC .............. H01M 8/04; H01M 8/04089; H01M 8/04223; H01M 8/04567; H01M 8/04753
USPC ......... 429/428, 429, 406, 454, 409, 417, 419; 244/58
See application file for complete search history.

(56) References Cited

U.S. PATENT DOCUMENTS

| | | | |
|---|---|---|---|
| 6,379,828 B1 * | 4/2002 | Worth | 429/406 |
| 2008/0001026 A1 * | 1/2008 | Hoffjann et al. | 244/58 |
| 2008/0210812 A1 * | 9/2008 | Gans et al. | 244/58 |
| 2009/0087700 A1 * | 4/2009 | Carlisle et al. | 429/13 |
| 2010/0021778 A1 * | 1/2010 | Steinshnider et al. | 429/13 |
| 2012/0053766 A1 * | 3/2012 | Ham et al. | 701/22 |

FOREIGN PATENT DOCUMENTS

| | | |
|---|---|---|
| JP | 2002-158026 A | 5/2002 |
| JP | 2004-247052 A | 9/2004 |
| KR | 10-2007-0106334 | 11/2007 |
| KR | 10-1090714 B1 | 12/2011 |

OTHER PUBLICATIONS

Machine Translation of: JP 2004/247052 A, Shoji et al., Sep. 2, 2004.*

* cited by examiner

*Primary Examiner* — Kenneth Douyette
(74) *Attorney, Agent, or Firm* — Mintz Levin Cohn Ferris Glovsky and Popeo, P.C.; Peter F. Corless

(57) ABSTRACT

Disclosed is a fuel cell startup apparatus and method, particularly, a fuel cell startup method, by which in an emergency situation such as when a high-voltage battery mounted on a fuel cell vehicle is completely discharged, fuel cell startup can be achieved without assistance of a high-voltage power source. To this end, an air supply port, which is connected to an emergency air supplier, is formed on an air supply line configured to supply air to a cathode of a fuel cell stack, and the emergency air supplier supplies the air to the fuel cell stack when complete discharge of a high-voltage battery and is removably engaged to the air supply port.

2 Claims, 3 Drawing Sheets

FUEL CELL STARTUP APPARATUS COMPRISING EMERGENCY AIR SUPPLIER AND METHOD

CROSS-REFERENCE TO RELATED APPLICATION

This application claims under 35 U.S.C. §119(a) the benefit of Korean Patent Application No. 10-2012-0091063 filed on Aug. 21, 2012, the entire contents of which are incorporated herein by reference.

BACKGROUND (a) Technical Field

The present invention relates to a fuel cell startup apparatus and method, and more particularly, to a fuel cell startup method, by which during an emergency such as when a high-voltage battery mounted on a fuel cell vehicle becomes completely discharged (i.e., the battery is dead), fuel cell startup can be achieved without assistance of a high-voltage power source.

(b) Background Art

Due to recent high oil prices and strict restrictions on $CO_2$ emissions, the vehicle industry has been focusing all their energies on the development of eco-friendly vehicles such as hydrogen fuel cell electric vehicles, pure electric vehicles, etc. Among the eco-friendly vehicles, the hydrogen fuel cell electric vehicle produces electricity through an electro-chemical reaction between hydrogen and the air, and drives a motor with the produced electricity to provide a driving force to the vehicle. To smoothly supply hydrogen and the air to a fuel cell stack, a high-voltage component (e.g., an air blower, a pump, etc.) is used and also for fuel cell startup, a high-voltage part capable of supplying high-voltage electricity is used.

In a conventional internal-combustion engine vehicle (i.e., gasoline and diesel), when a low-voltage battery is completely discharged, power is supplied to the low-voltage battery (e.g., a jump start is applied), thus facilitating startup. However, in an eco-friendly electric vehicle, there is yet not real way to easily "jump start" a high-voltage battery. That is, in a fuel-cell vehicle which is a type of pure electric vehicle, high-voltage electricity is supplied using a high-voltage battery or a super-capacitor in fuel cell startup, but when the battery is dead (i.e., completely discharged) or the battery fails, startup becomes impossible. This requires the driver to call a tow truck and endure very high repair fees and significant inconvenience.

Moreover, a stationary fuel cell supplies a high voltage in startup by using a high-voltage power supply instead of a high-voltage battery. However, also in this case, when the high-voltage power supply is out of order or a power failure occurs, startup also becomes impossible. Furthermore, the stationary fuel cell has limitations in use thereof because an interruptible power supply (UPS) is difficult to use as emergency power source when a power failure occurs in a building.

Considering the difficulties associated with re-startup of a vehicle in the case of complete discharge of a high-voltage battery of a hydrogen fuel cell electric vehicle, a pure electric vehicle, a hybrid electric vehicle, etc., various schemes for re-startup have been proposed, including a high-voltage charge port, etc. However, due to cost of implementation and difficulty in packaging, the high-voltage charge port has not been adopted by any automotive manufacture to date.

SUMMARY OF THE DISCLOSURE

Accordingly, the present invention has been made to solve the foregoing problem, and provides a fuel cell startup apparatus and method, by which even in an emergency state where a high-voltage power source, such as a high-voltage battery, mounted on a fuel cell vehicle is completely discharged (i.e., "dead"), fuel cell startup can be achieved without assistance of the high-voltage power source.

According to an aspect of the present invention, there is provided a fuel cell startup apparatus in which an air supply port, which can be engaged with an emergency air supplier, is formed on an air supply line which supplies air to a cathode of a fuel cell stack, and the emergency air supplier which supplies the air to the fuel cell stack when the high voltage battery is completely discharges, is removably engaged with the air supply port.

Preferably, the emergency air supplier may be removably mounted on the air supply line of an air blower. In particular, the emergency air supplier may adopt any one selected from among compressed air cylinder and bomb filled with the compressed air, and a fan operating with low-voltage power. In addition, a manual or automatic control-type shut-off valve may be mounted on the air inlet line of an air blower.

According to another aspect of the present invention, there is provided a fuel cell startup method including, in an emergency situation where a high-voltage battery is completely discharged, engaging an emergency air supplier to an air supply port formed on an air inlet line of an air blower, supplying the compressed air in the emergency air supplier to a cathode of a fuel cell stack, and producing electricity in the fuel cell stack through electro-chemical reaction between the air supplied to the cathode of the fuel cell stack and hydrogen supplied to an anode of the fuel cell stack.

BRIEF DESCRIPTION OF THE DRAWINGS

The above and other features of the present invention will now be described in detail with reference to an exemplary embodiment thereof illustrated the accompanying drawings which are given hereinbelow by way of illustration only, and thus are not limitative of the present invention, and wherein.

DETAILED DESCRIPTION

Hereinafter, the present invention will be described in detail with reference to the accompanying drawings to allow those of ordinary skill in the art to easily carry out the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes fuel cell electric vehicles, plug-in hybrid fuel cell electric vehicles and other alternative fuel vehicles (e.g. fuels derived from resources other than petroleum). As referred to herein, a hybrid vehicle is a vehicle that has two or more sources of power, for example both gasoline-powered and fuel cell electric-powered vehicles.

First, to facilitate understanding of the present invention, the structure of a fuel cell system mounted on a hydrogen fuel cell electric vehicle will be described. The fuel cell system mounted on the fuel cell vehicle may include a fuel supply system that supplies a fuel (hydrogen) to a fuel cell stack, an air supply system including an air blower and a humidifier to supply oxygen in the air, which serves as an oxidizer necessary for electro-chemical reaction, to the fuel cell stack, a heat and water control system 40 for controlling an operating temperature of the fuel cell stack, and so forth.

Figure 3:
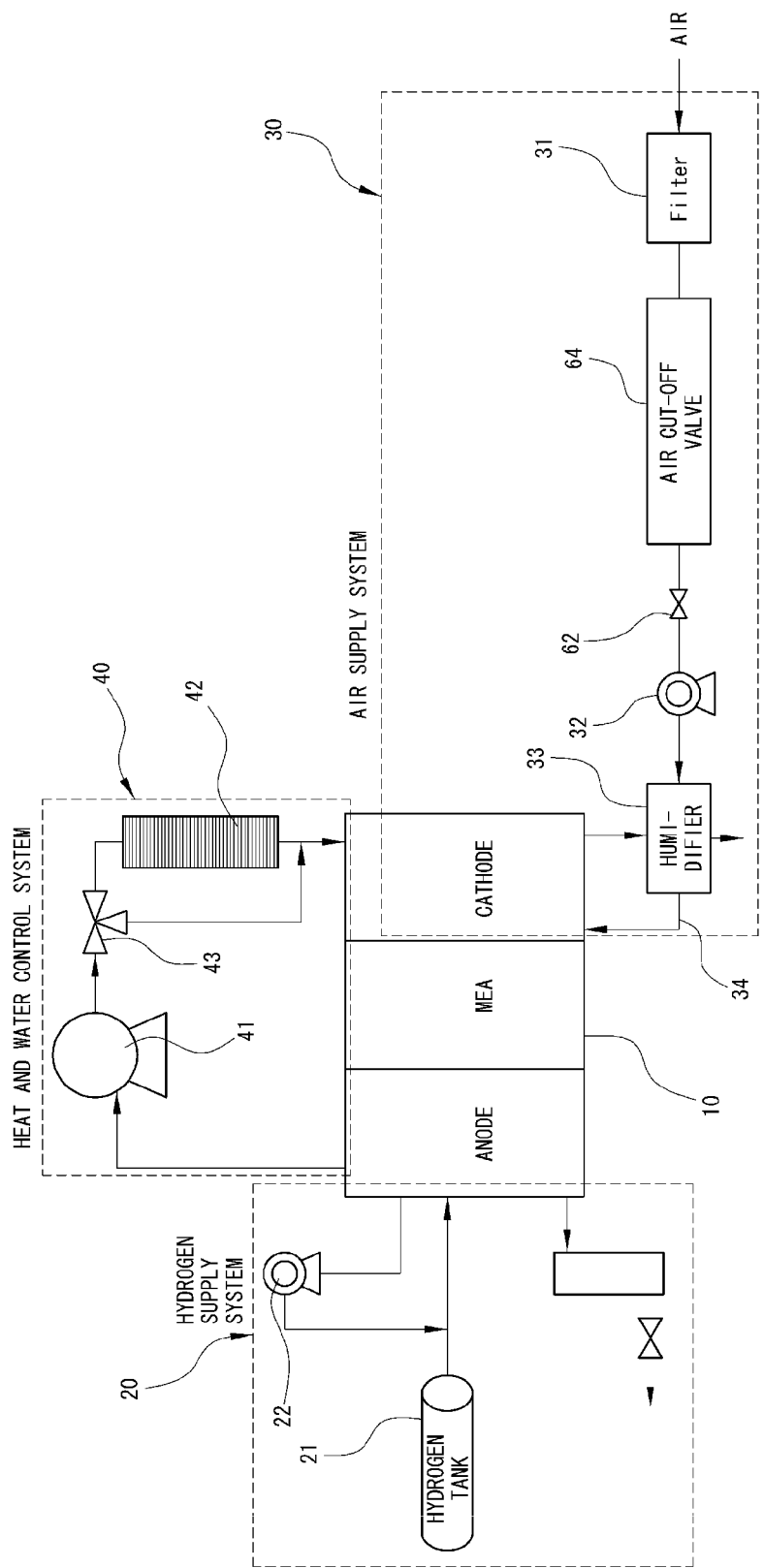
FIG. 3 is a schematic diagram for describing a structure of a fuel cell system mounted on a fuel cell vehicle.

As shown in FIG. 3, a fuel supply system 20 may include a hydrogen tank 21 configured to supply hydrogen to a fuel anode of a fuel cell stack 10, a hydrogen supply blower 22 configured to re-supply a portion of the hydrogen which has been reacted in the stack 10, and so forth. The air supply system 30 may include a filter 31 configured to filter foreign substances from the air, an air blower 32 configured to suction the filtered air, a humidifier 33 configured to humidify the dry air and supply the humidified air to a cathode of the stack 10, and so forth. The heat and water control system 40 may be structured such that a water pump 41, a vibration thermostat 43, a radiator 42, etc., are sequentially disposed in a direction from a cooling water outlet toward a cooling water inlet.

In particular, for fuel cell startup, a high-voltage item such as the air blower 32 has to operate, and to this end, to supply power to each high-voltage item, a high-voltage power supply means such as a high-voltage battery 50 or a super-capacitor is mounted therein to do so during normal operation. Also, the hydrogen supply blower 22 and the water pump 41 use power from a 12V-auxiliary battery (not shown), so that they may operate without any problem in the startup process.

Figure 2:
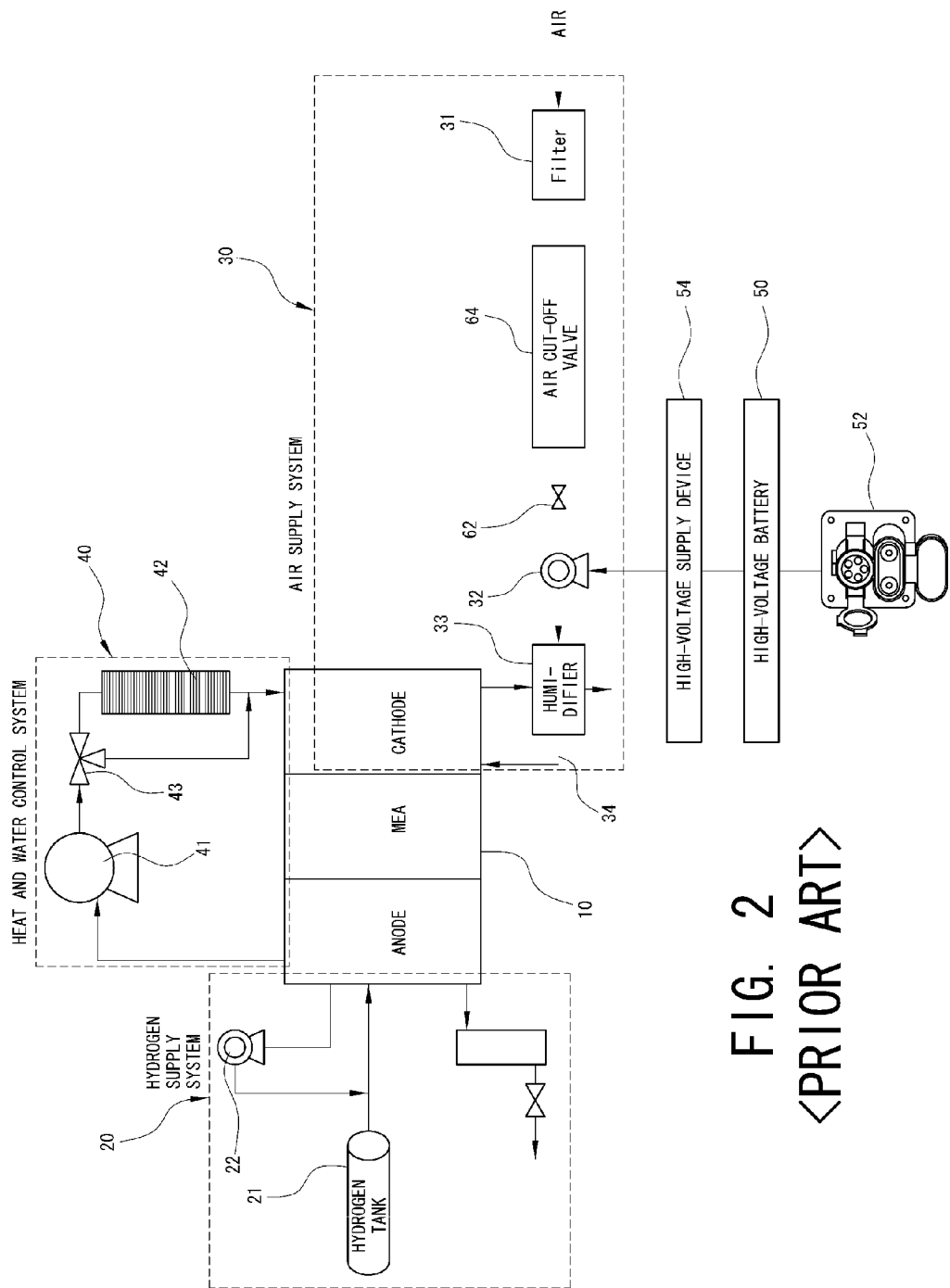
FIG. 2 is a schematic diagram showing a conventional fuel cell startup apparatus.

However, as mentioned previously, when the high-voltage battery 50 is completely discharged or fails, the air blower 33 cannot operate, therefore fuel cell startup becomes impossible. Accordingly, to provide a method for starting the vehicle once the high-voltage battery has failed, it has been proposed, as shown in FIG. 2, that an external charge port 52 that is mounted within the vehicle and be configured to supply external power to and charge the high-voltage battery 50. Once the high-voltage battery 50 has been charged through the external charge port 52, a high-voltage supply device 54 may be driven.

However, in this solution, high development costs are required in order to implement the external charge port 52 and designing and packaging for mounting of the external charge port 52 is difficult to achieve. For this reason, the external charge port 52 has not still been adopted by automotive manufactures. Thus, there is a need for a startup solution for a fuel cell vehicle in an emergency caused by complete discharge of the high-voltage battery 50.

To this end, the present invention provides an emergency air supplier (e.g., a compressed air cylinder) that is configured to supply air to a fuel cell stack, in place of an air blower (which needs power of the high-voltage battery 50), when the high-voltage battery 50 is completely discharged.

Figure 1:
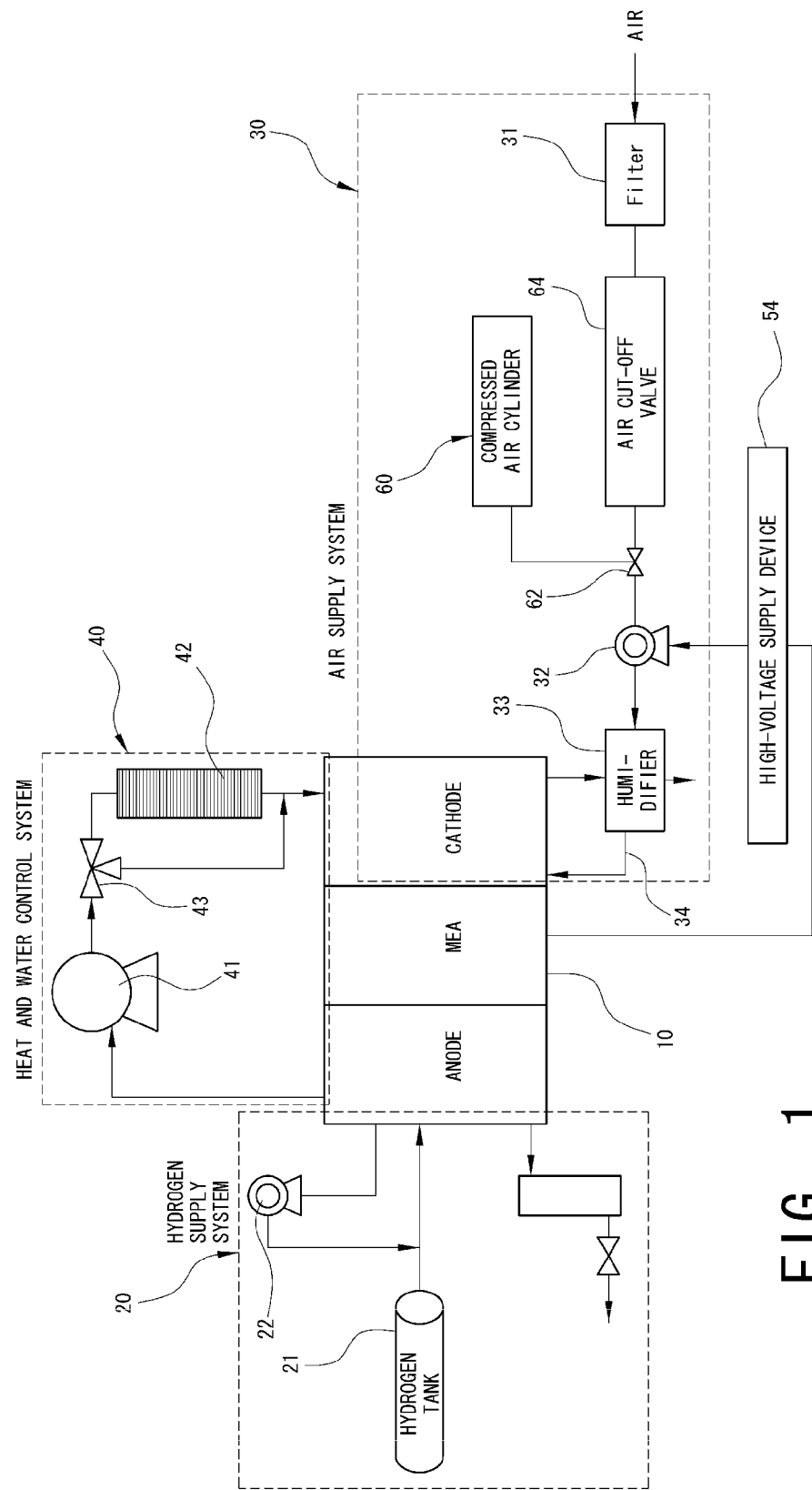
FIG. 1 is a schematic diagram showing a fuel cell startup apparatus according to an exemplary embodiment of present invention.

As shown in FIG. 1, an emergency air supplier 60 according to the present invention is removably mounted in an inlet position of a cathode of a fuel cell stack 10, preferably on an air inlet line 34 of an air blower 33. For the emergency air supplier 60 (e.g., a compressed air cylinder/bomb or a fan operating via a low-voltage power source (e.g., a battery, etc.), may be used.

At an air inlet line 34 of the air blower 32 is formed an air supply port 62 which can be directly connected to the emergency air supplier 60 in a quick connect engagement manner (e.g., much like engaging a butane gas can to a portable gas range).

Preferably, a manual or automatic control-type shut-off valve 64 is further mounted on the air inlet line 34, such that the shut-off valve 64 is closed normally and is open for air supply when the emergency air supplier 60 is engaged thereto.

Hereinafter, a description will be made of a fuel cell startup method according to the present invention based on the above structure. When a charge amount of the high-voltage battery 50 is maintained in a normal state, the air blower 33 normally operates using the high-voltage battery 50 as a power source, such that the shut-off valve 64 mounted on the air inlet line 34 of the air blower 33 is maintained closed.

In an emergency situation where the high-voltage battery 50 is completely discharged, to temporarily supply the air to the fuel cell stack 10 through the air blower 33, the emergency air supplier 60 is engaged to the air supply port 62 formed on the air inlet line 34 of the air blower 33 and then the shut-off valve 64 is opened. That is, the compressed air cylinder/bomb filled with compressed air or a fan operating with low-voltage power may be selectively connected to the air supply port 62 formed on the air inlet line 34 of the air blower 32 in the aforementioned quick connect engagement manner. Therefore, the compressed air in the emergency air supplier 60 passes through the air blower 33 and the humidifier and then is provided to the cathode of the fuel cell stack 10.

In this state, the hydrogen supply blower 22 operates using a 12V-auxiliary battery mounted in the vehicle as a power source, such that hydrogen in a hydrogen tank is supplied to an anode of the fuel cell stack 10. As a result, the fuel cell stack 10 can produce electricity using electro-chemical reaction between hydrogen and the air. That is, oxidation of hydrogen is performed in the anode of the fuel cell stack 10, generating protons and electrons, and the generated protons and electrons move toward the cathode through an electrolyte layer and a separation plate, respectively. In the cathode, through electro-chemical reaction among the protons and electrons coming from the anode, and oxygen in the air, water is generated, and at the same time, electric energy is produced from the flow of electrons. At this time, high voltage generated in the fuel cell stack 10 is supplied to the air blower 32, which is a high-voltage item, through the high-voltage supply device 54, such that the air blower 32 can operate normally.

After normal startup of the fuel cell, the emergency air supplier 60 is removed and the shut-off valve 64 is closed. The emergency air supplier 60 may be re-used later when necessary. As such, even in case of occurrence of complete discharge of a high-voltage battery, by using an emergency air supplier, fuel cell startup, that is, electricity production of a fuel cell stack can be achieved, such that in a complete discharge situation of a high-voltage battery of a fuel cell vehicle can be remedied and, an on-site action can be taken, thus improving convenience, salability, stability, etc., of the fuel cell vehicle.

Advantageously, according to the present invention, fuel cell startup can be achieved by taking a simple action of engaging an emergency air supplier to an air supply line in quick-connect engagement manner even in an emergency state where a high-voltage battery of a fuel cell vehicle is discharged, thereby allowing a driver to directly take an on-site action the high-voltage battery of the fuel cell vehicle has been completely discharged and thus improving convenience, salability, stability, etc., of the fuel cell vehicle.

| [Description of Reference Numerals] | |
| --- | --- |
| 10: Fuel Cell Stack | 20: Fuel Supply System |
| 21: Hydrogen Tank | 22: Hydrogen Supply Blower |
| 30: Air Supply System | 31: Filter |
| 32: Air Blower | 33: Humidifier |
| 40: Heat and Water Control System | 41: Water Pump |
| 42: Radiator | 50: High-Voltage Battery |
| 52: External Charge Port | 54: High-Voltage Supply Device |
| 60: Emergency Air Supplier | 62: Air Supply Port |
| 64: Shut-Off Valve | |

What is claimed is:

1. A fuel cell startup method comprising:

in a normal state where a charge amount of a high-voltage battery is maintained, closing an air inlet line of an air blower;

in an emergency situation where the high-voltage battery is completely discharged, engaging an emergency air supplier to an air supply port formed on the air inlet line of the air blower;

supplying compressed air in the emergency air supplier to a cathode of a fuel cell stack; and producing electricity in the fuel cell stack through electrochemical reaction between the air supplied to the cathode of the fuel cell stack and hydrogen supplied to an anode of the fuel cell stack in response to the cathode receiving the compressed air.

2. The fuel cell startup method of claim 1, wherein the emergency air supplier is selected from a group consisting of a compressed air cylinder and bomb filled with the compressed air, and a fan operating with low-voltage power, to temporarily supply the air to the cathode of the fuel cell stack when the high voltage battery is completely discharged.

* * * * *